(12) United States Patent
Hunt et al.

(10) Patent No.: US 10,995,525 B2
(45) Date of Patent: May 4, 2021

(54) SINGLE ROTATION RELEASE GEAR BLOCKING LEVER

(71) Applicant: Kiekert Aktiengesellschaft, Heiligenhaus (DE)

(72) Inventors: Robert J. Hunt, Davisburg, MI (US); Adrin Wagner, Saline, MI (US)

(73) Assignee: Kiekert AG, Heiligenhaus (DE)

( * ) Notice: Subject to any disclaimer, the term of this patent is extended or adjusted under 35 U.S.C. 154(b) by 388 days.

(21) Appl. No.: 15/708,861

(22) Filed: Sep. 19, 2017

(65) Prior Publication Data

US 2020/0024873 A1 Jan. 23, 2020

(51) Int. Cl.
| | |
|---|---|
| *E05B 81/14* | (2014.01) |
| *E05B 81/06* | (2014.01) |
| *E05B 81/30* | (2014.01) |
| *G05G 5/08* | (2006.01) |
| *E05B 85/26* | (2014.01) |
| *F16H 1/16* | (2006.01) |

(52) U.S. Cl.
CPC .............. *E05B 81/14* (2013.01); *E05B 81/06* (2013.01); *E05B 81/30* (2013.01); *E05B 85/26* (2013.01); *G05G 5/08* (2013.01); *F16H 1/16* (2013.01); *G05G 2505/00* (2013.01)

(58) Field of Classification Search
CPC .......... E05B 81/06; E05B 85/26; E05B 81/14; E05B 81/15; E05B 81/16; E05B 81/20
See application file for complete search history.

(56) References Cited

U.S. PATENT DOCUMENTS

| | | | | |
|---|---|---|---|---|
| 5,979,951 A | * | 11/1999 | Shimura | E05B 85/26 292/216 |
| 6,390,517 B1 | * | 5/2002 | Ehret | E05B 81/14 292/201 |
| 6,416,092 B1 | * | 7/2002 | Rathmann | E05B 81/14 200/50.1 |
| 6,575,003 B1 | * | 6/2003 | Dupont | E05B 81/14 292/201 |

(Continued)

FOREIGN PATENT DOCUMENTS

| | | |
|---|---|---|
| DE | 199 48 052 A1 | 4/2001 |
| DE | 102 58 645 | 7/2004 |

(Continued)

OTHER PUBLICATIONS

International Search Report and Written Opinion of Application No. PCT/IB2018/001048 dated Dec. 6, 2018.

*Primary Examiner* — Jeremy R Severson
(74) *Attorney, Agent, or Firm* — Renner, Otto, Boisselle & Sklar, LLP

(57) ABSTRACT

The object of the present invention is a drive unit for a motor vehicle component with an electromotor (5) and a rotatable output element (7). Furthermore, a blocking element (9), which can be acted on by an actuator (10), is provided for interacting with a protrusion (15) on the output element (7). According to the invention, the protrusion (15) detaches the blocking element (9) from a stop (17) at the start of a rotational movement of the output element (7). Thus, the blocking element (9) is transferred into a blocking position with the aid of the actuator (10) in which the blocking element (9) blocks a rotation of the output element (7) beyond a specified point.

18 Claims, 3 Drawing Sheets

(56) References Cited

U.S. PATENT DOCUMENTS

| | | | |
|---|---|---|---|
| 7,261,013 B2* | 8/2007 | Kachouh | B60N 2/0232 |
| | | | 292/201 |
| 9,617,761 B2* | 4/2017 | Scholz | E05B 81/14 |
| 2012/0175896 A1* | 7/2012 | Martinez | E05B 81/06 |
| | | | 292/199 |
| 2017/0009494 A1* | 1/2017 | Scholz | E05B 81/16 |

FOREIGN PATENT DOCUMENTS

| | | |
|---|---|---|
| DE | 10 2004 027 420 A1 | 12/2005 |
| EP | 1 091 061 A2 | 4/2001 |
| EP | 1 603 213 A2 | 12/2005 |

* cited by examiner

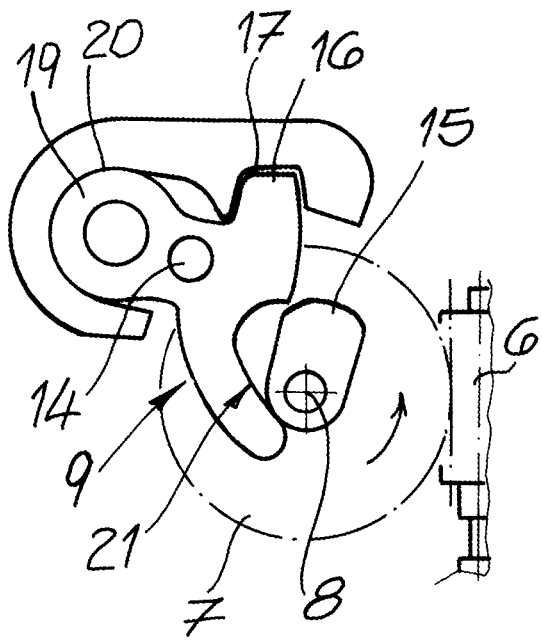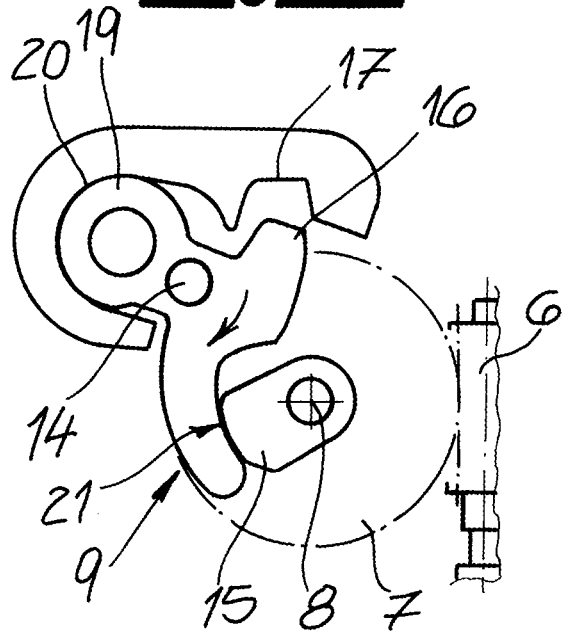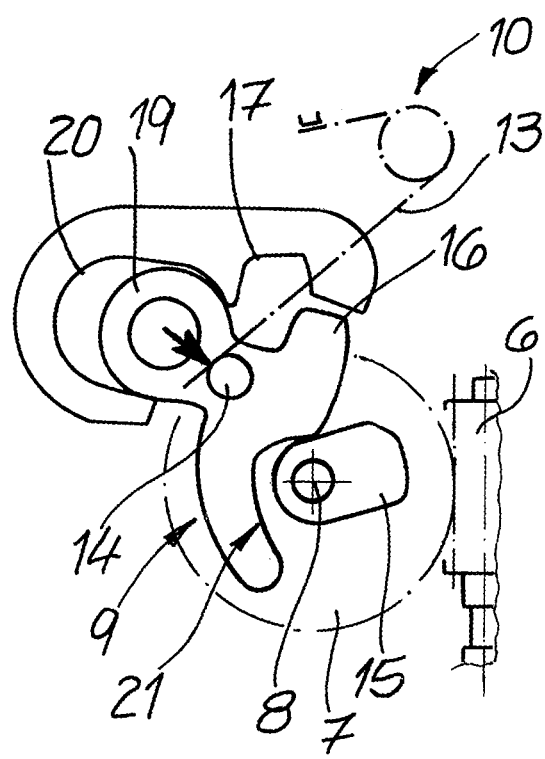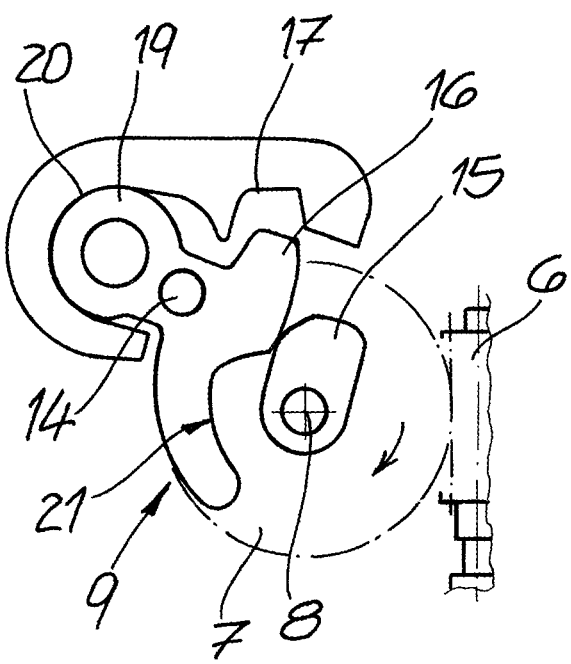

SINGLE ROTATION RELEASE GEAR BLOCKING LEVER

The invention is directed to a drive unit for a motor vehicle component, especially for a motor vehicle door latch component. The drive unit is preferably provided for a drive of a locking mechanism of a motor vehicle door latch. The drive unit comprises an output element which has a protrusion, an electromotor, which is provided for rotating the output element, with an actuator and with a blocking element, which can be acted on by the actuator, for interaction with the protrusion on the output element.

BACKGROUND

Drive units for motor vehicle components are known in diverse compositions and are used in practice millionfold. Such drive units are used in particular with so-called electrolatches, i.e. motor vehicle door latches comprising an electromotor drive for an opening of the locking mechanism by lifting a pawl as a component of the locking mechanism. Such drive units are called electrical opening drives in this context.

The class-specific state of the art according to DE 102 58 645 B4 describes a motor vehicle door latch with several functional units. The pertaining latch mechanism in this context possesses an adjustable drive which can travel into a blocking and a non-blocking position. The stop in the blocking position can interact directly with the drive of one of the functional units. To this end, the stop possesses a stop surface corresponding to an engagement element and is also pre-tensioned into a blocking position with spring force. The spring generating spring force functions as an actuator in the above sense in this case.

In the further state of the art according to DE 10 2004 027 420 A1 a motorized motor vehicle component is described which is equipped with a motor, a gearbox and a component which can be adjusted with the aid of the drive. Furthermore, an adjustable blocking element is provided for which can be brought into blocking engagement with the drive.

Finally, DE 199 48 052 A1 relates to a door latch with an opening aid. To this end, a revolving driving pin driven by a motor is provided for which takes along the pawl on its track when the drive is switched on and transfers it into a position releasing the catch. The driving pin subsequently runs against a stop. The stop is arranged on a blocking lever accommodated separately from the pawl. The blocking lever is transferred into its blocking position by the pawl during its relocation into the position releasing the catch.

This state of the art has proven itself. However, in the case of electromotorized opening drives for the locking mechanism of motor vehicle door latches, often in practice oscillations or uncontrolled movements of the drive or the drive unit occur upon or following the opening movement. Said movements are attributable, for example, to elasticities in the components typically made of plastic. Unusual noise evolutions or in certain circumstances indifferent functional states are associated with this. The invention aims to prevent such movements.

SUMMARY OF THE INVENTION

The invention is based on the technical problem of further developing such a drive unit for a motor vehicle component in such a way that functionally safe operation is guaranteed and in particular oscillations in the drive and indifferent functional states are prevented.

In order to solve this technical problem, a drive unit is characterized according to the invention in that the protrusion on the output element detaches the blocking element from of a stop by means of a rotational movement, so that the blocking element is transferred from its resting position with the aid of the actuator into a blocking position in which the blocking element blocks rotation of the output element beyond a specified point. This means that initially the blocking element assumes a resting position adjacent to the stop. By means of the rotational movement of the output element and consequently of the protrusion the blocking element is detached from the stop. As a consequence hereof, the blocking element is transferred from its resting position into the blocking position with the aid of the actuator.

The blocking element is initially situated in its resting position before the start of a rotational movement of the output element. According to the invention, at the start of this rotational movement the protrusion ensures detachment of the blocking element from the stop. I.e. the blocking element is initially held firm in the resting position with the stop and is adjacent to the stop, and is then detached from the stop due to the rotational movement of the output element the blocking element.

Due to the fact that the blocking element is detached from the stop, the blocking element can be transferred into the blocking position. The transfer of the blocking element from its resting position into the blocking position is at least assisted and preferably effected by the actuator. In this blocking position, the blocking element is able to stop the rotational movement of the output element.

As a consequence hereof, the rotation of the output element can be limited to rotation up to a determined point. The determined point is given by the position of the blocking position relative to the rest position of the blocking element. Rotation of the output element is preferably limited to a complete revolution. Alternatively, limitations to less than a complete revolution, for example to a half revolution, are possible. However, more than one rotation is not permitted because the blocking element previously situated in the blocking position stops further movement. i.e. the blocking element situated in the blocking position automatically ensures that the rotational movement of the output element is stopped or blocked. according to the invention, indifferent functional states of the drive unit therefore can in principally not occur, as the output element is fixed with the aid of the blocking element in the blocking position, providing a clear and defined position of the output element.

This blocking position can advantageously be terminated by the blocking element situated in the blocking position being transferred into its resting position adjacent to the stop by means of a cessation of force of the output element. i.e. for termination of the blocking position of the blocking element it is only necessary to stop supplying the electromotor with power. The protrusion is thus released from the blocking element and the blocking element can be transferred from the blocking position into the resting position. This is all achieved simply, functionally safe and by means of a simple construction.

The blocking element is to this end preferably rotatably accommodated in a guide. The blocking element itself is generally reverse T-shaped possessing two T-legs which are largely vertical to one another. Largely vertical to one another is to be understood to mean, in this context, as the longitudinal axes of the T-legs having an angle of 90°±15° with one another.

The configuration is preferably such that one T-leg of the blocking element has a blocking nose for interacting with the stop at one end and a curved contour at the other end. The blocking element interacts with the protrusion on the output element by means of the curved contour.

The configuration is also advantageously such that the stop and the blocking nose have forms fitting into one another in a tongue-and-groove connection. This configuration ensures a secure blocking position in a simple manner.

To enable the blocking nose to leave the stop, a pivoting movement of the blocking element is typically necessary which is enabled by the rotatable accommodation of the blocking element in the guide. For this purpose, the other T-leg of the blocking element is advantageously formed as a bearing eye rotatably accommodated in the guide. Thus, the blocking element can be moved backwards and forwards with the relevant T-leg formed as a bearing eye to a certain extent within the guide.

The blocking element is also advantageously equipped with a pin. The actuator can engage the pin. The actuator can be a spring. Alternatively or additionally, the actuator can also be formed as a storage lever sensing a position of the locking mechanism. Such storage levers are used, for example in the state of the art according to DE 10 2012 017 677 A1, in order to prevent an interaction of a triggering element with the locking mechanism during the opening movement of the catch.

As a result, a drive unit is described for a motor vehicle component that is with special advantage configured as a drive unit for a locking mechanism of a motor vehicle door latch. In this case, it involves an opening drive for the relevant locking mechanism. According to the invention, the drive unit comprises the blocking element, which is transferred from the resting position into the blocking position during a rotation of the output element to block the output element after a specified amount of rotation, preferably after a complete revolution. A further rotation of the output element is consequently not possible. After ending the actuating movement the drive unit thus assumes a defined functional position.

Hereinafter, the invention is explained in further detail based on drawings showing two preferred exemplary embodiment.

DETAILED DESCRIPTION

Figure 1:
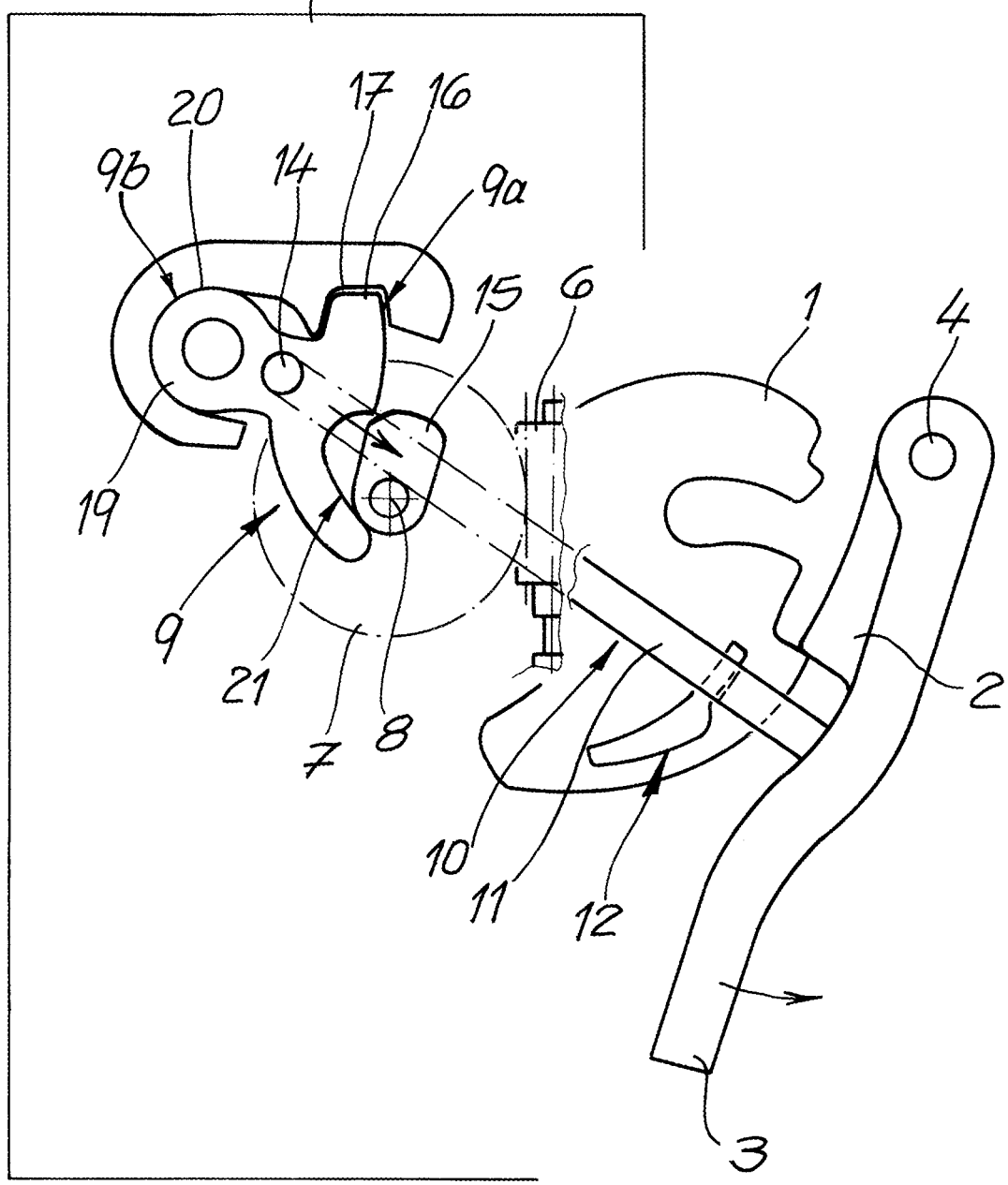
FIG. 1 the drive unit according to the invention in conjunction with a motor vehicle door latch, FIG. 2A-D different positions of the drive unit according to FIG. 1 and FIG. 3 the object according to FIG. 1 in further detail and other functional position.
Figure 3:
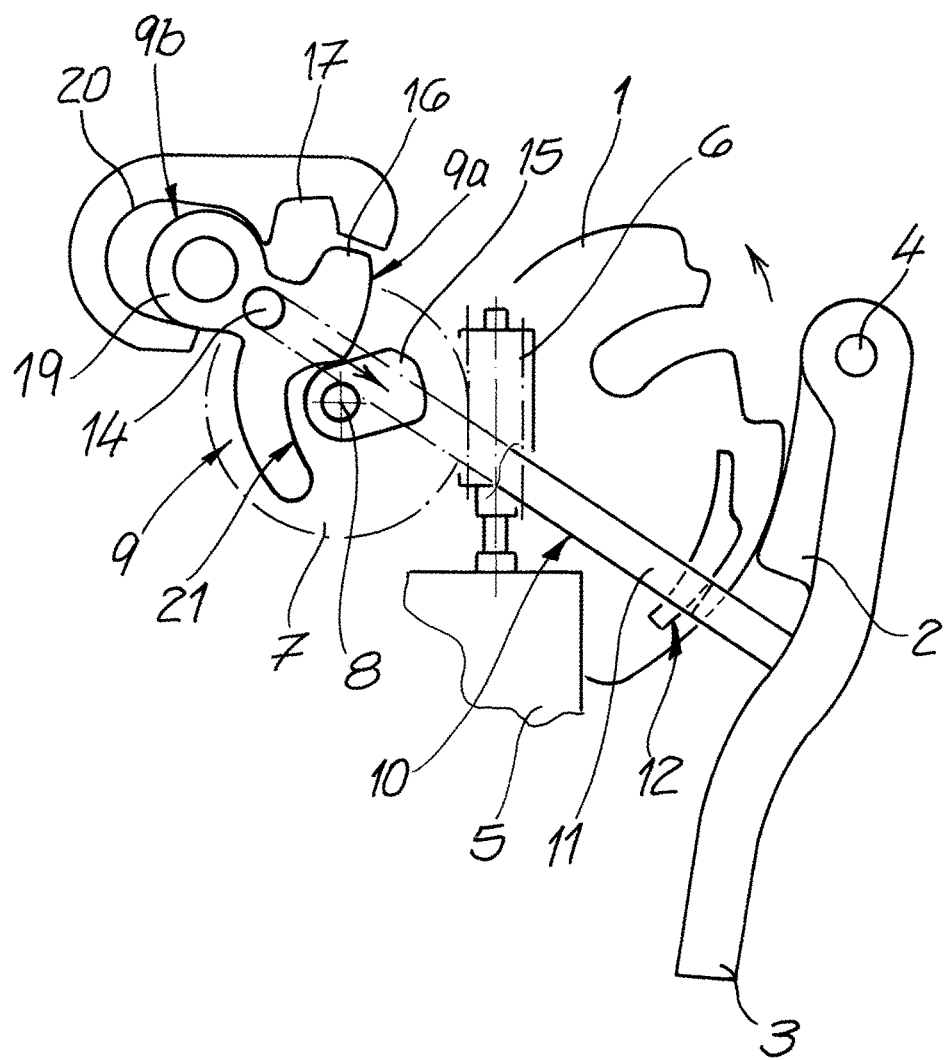

A drive unit for a motor vehicle component is shown in the figures. In the exemplary embodiment and not restrictively, the drive unit works on a locking mechanism of a motor vehicle door latch. To this end, the essential elements of this motor vehicle door latch are shown in FIGS. 1 and 3. The locking mechanism consists of a catch 1 and a pawl 2. A triggering lever 3 is also shown.

According to the exemplary embodiment and not restrictively, the triggering lever 3 and the pawl 2 are connected and are pivotable around a common axis 4. A pivoting movement of the triggering lever 3, and consequently of the pawl 2, in the anti-clockwise direction around the axis 4, as indicated in FIG. 1, corresponds to a lifting of the pawl 2 from its engagement with the catch 1. The catch 1 can subsequently pivot in a spring-assisted manner and release a previously trapped locking bolt. A motor vehicle door, to which the motor vehicle door latch is assigned, can now be opened.

In this exemplary case, to lift the pawl 2 from its engagement with the catch 1, the triggering lever 3 is acted on via the drive unit described in further detail below. The drive unit is accordingly an opening drive for the locking mechanism. To this end, the drive unit has an electromotor 5 equipped with a wormgear 6 on its pinion shaft. The wormgear 6 drives an output element 7 rotatable with the aid of the electromotor 5 by means of an interconnection on the external circumference which is formed as an output disk in the exemplary embodiment and performs rotational movements around its axis 8.

Furthermore, a blocking element 9 is provided for which is being acted on with the aid of an actuator 10, said actuator 10 being only roughly sketched in FIG. 1. To open the locking mechanism, the output element 7 acts on the triggering lever 3 and moves it in anti-clockwise direction as depicted in FIG. 1. The locking mechanism is opened. This is apparent in the transition from the functional position according to FIG. 1 to the functional position according to FIG. 3.

In FIGS. 1 and 3 the actuator 10 is formed as a storage lever 11, with the aid of which the triggering lever 3 and consequently the pawl 2 connected to it maintain the catch 1 in a position which is ineffective in relation to the locking mechanism during an opening movement as depicted in FIG. 3. To this end, the actuator 10 or the storage lever 11 interacts with a storage step or generally a contour 12 on the catch 1, as can be seen comparing FIGS. 1 and 3. Thus, the actuator 10 or the storage lever 11 works, according to the variant in FIGS. 1 and 3, in such a way on the blocking element 9, that it is moved radially in a direction towards the axis 8 of the output element 7 as depicted by an arrow in FIG. 1.

In other words, in the variant according to FIGS. 1 and 3 the output element 7 ensures via its rotational movement that the triggering lever 3 is pivoted around its axis 4 in an anti-clockwise direction. Hereby the pawl 2, which is non-rotatably connected to the triggering lever 3, is taken along and detached from the catch 1, thus opening of the locking mechanism. The catch 1 thereby pivots into its "open" position as shown by an arrow in FIG. 3. An anti-clockwise direction movement of the catch 1 corresponds to this. The output element 7 may work on the triggering lever 3 for this purpose by means, for example, of an adjusting lever or crank handle, which is however not depicted in detail.

The catch 1 is shown in its closed position in FIG. 1. On transition from its closed position according to FIG. 1 into the open position according to FIG. 3, the contour 12 on the catch 1 now interacts with the actuator 10 or the storage lever 11. Due to this interaction, the triggering lever 3 and the pawl 2 are kept away from the catch 1 and can consequently not interact with the catch 1. On the other hand, the storage lever 11 or the actuator 10 are acted on radially in the direction towards the axis 8 of the output element 7, as depicted by an arrow in FIG. 1.

Alternatively to the embodiment of the actuator 10 as a storage lever 11 as in FIGS. 1 and 3, it is also possible here to have recourse simply to a leg spring 13 shown in the second exemplary embodiment of FIG. 2C. The leg spring 13 lies with one leg against a pin 14 on the blocking element 9 in order to act on the blocking element 9 with a force in the radial direction depicted in FIG. 2C via an arrow. The storage lever 11 of FIGS. 1 and 3 can also work on the relevant pin 14 in the same radial direction. Alternatively other spring forms than a leg spring 13 for the actuator 10 are conceivable.

Viewing the functional sequence from FIG. 2A to 2D, one sees that the blocking element 9 interacts with a protrusion 15 on the output element 7. The protrusion 15 is arranged on a common axis 8 together with the output element 7 and rotatable around said common axis.

Comparing FIGS. 2A to 2D, it is apparent that the blocking element 9 overall has a reverse T-shape with a first T-leg 9a and a second T-leg 9b. The first T-leg 9a is equipped with a blocking nose 16 at one end. The blocking nose 16 interacts with a stop 17 formed in a housing 18 accomodating the drive unit. In the exemplary embodiment, the stop 17 is groove-like. The blocking nose 16 has a corresponding spring-like shape so that the blocking nose 16 can resting position largely engage into the groove-like stop 17 as shown in FIG. 2A.

The other T-leg 9b of the reverse T-shaped blocking element 9 is on one end form a bearing eye 19 that is rotatable accommodated in a guide 20. Like the groove-like stop 17 the guide 20 is located in or on the housing 18, or is formed in the relevant housing 18. The housing 18 is preferably a plastic injection molded component.

According to the exemplary, the guide 20 is U-shaped so that the bearing eye 19 engaging herein can execute pivoting movements in respect of the guide 20. In the resting position of the blocking element 9 shown in FIG. 2A the lateral leg of the guide 20 limits these movements.

The function is as follows. Starting from the resting position according to FIG. 2A, the electromotor 5 is powered in such a way that the output elements 7 performs an anti-clockwise movement around its axis 8. This anti-clockwise movement is used, as in FIGS. 1 and 3, to pivot the triggering lever 3 and consequently the pawl 2 in an anti-clockwise direction around the axis 4. This opening movement opens the locking mechanism. The blocking nose 16 of the blocking element 9 lies against the stop 17 in the resting position or the spring-like blocking nose 16 engages into the groove-like stop 17.

The start of a rotating movement of the output element 7 around the axis 8 shown in the subsequent FIG. 2B now ensures that the blocking element 9 is detached in respect of the stop 17. As can be seen from the transition from FIG. 2A to FIG. 2B, the protrusion 15 together with the output element 7 perform roughly a quarter rotation around the common axis 8 in an anti-clockwise direction. In this process, the protrusion 15 is comes to lie against a curved contour 21 provided at the other end of the T-leg 9a of the reverse T-shaped blocking element 9. The curved contour 21 is arranged mainly opposite the blocking nose 16.

Due to the movement of the protrusion 15 against the curved contour 21 the blocking element 9 is rotated relative to its bearing eye 19 accommodated within the guide 20, as can be seen comparing FIG. 2A with FIG. 2B. The blocking element 9 hereby performs a clockwise direction movement illustrated in FIG. 2B with consideration of an axis within the guide 20 defined by the bearing eye 19.

The described pivoting movement of the blocking element 9 leads to a release of the blocking nose 16 from the stop 17. Comparing FIG. 2A with FIG. 2B, it is apparent that the spring-like blocking nose 16 is in this process pivoted out of the groove-like stop 17. The blocking element 9 is thus released from the stop 17.

As the blocking element 9 is now no longer held by the stop 17 in the resting position, the actuator 10, as shown in FIG. 2C, ensures that the blocking element 9 is pushed within the guide 20 radially in a direction towards the axis 8 of the output element 7. The actuator 10 shown in FIG. 2C is the spring or leg spring 13 acting on the pin 14 on the blocking element 9 to this end. Alternatively, the actuator 10 embodied as a storage lever 11 according to the first exemplary embodiment according to FIGS. 1 and 3 can ensure action on the blocking element 9 in the radial direction depicted in FIG. 2C.

As a consequence of the radial movement of the blocking element 9, as shown in the transition from the functional position in FIG. 2B to the functional position according to FIG. 2C, the blocking nose 16 also moves away from the stop 17 in a transverse direction. Thus, the blocking nose 16 can no longer interact with the stop 17 in this functional position.

A blocking position of the blocking element 9 is shown ultimately in FIG. 2D. As soon as the blocking element 9 has, aided by the actuator 10, assumed the blocking position of FIG. 2D, the protrusion 15 is blocked and stopped by the blocking element 9. The same applies to the output element 7 and consequently the electromotor 5 and thus the drive unit overall. It is apparent in the transition from the functional position of FIG. 2C to FIG. 2D that the blocking element 9 is radially shifted with respect to the guide 20 with the aid of the protrusion 15 until the blocking nose 16 is again positioned opposite the stop 17. A rotation of the output element 9 beyond a specified point is hereby blocked. In both shown exemplary embodiments, this specified point corresponds to a complete revolution of the output element 7. In principle, it is possible to select other specified points beyond which rotation is blocked by adjustment of the shape of the blocking element 9, for example, a point corresponding to half a revolution.

It is apparent that during the entire functional sequence from FIG. 2A with the blocking element 9 situated in the resting position to FIG. 2D with the blocking position of the blocking element 9, the protrusion 15 and consequently also the output element 7 has executed a rotational movement around approximately 360°. A further rotation of the output element 7 is not possible due to the protrusion 15 having transferred the blocking element 9 from the resting position into the blocking position during the opening movement. Ultimately, the drive unit has itself ensured the blockage.

If now, starting from the blocking position of the blocking element 9 illustrated in FIG. 2D, the electromotor 5 ceases exerting a force on the blocking element 8 via the output element 7 and the protrusion 15, then, as illustrated in FIG. 2D by the arrow in a clockwise direction, the blocking element 9 is released and pushes the protrusion 15 in clockwise direction. Thus, the blocking element 9 resets and assumes its resting position according to the illustration in FIG. 2A. i.e. the blocking element 9 situated in the blocking position according to FIG. 2D is transferred into its resting position adjacent on the stop 17 by the described reversing movement of the output element 7. It is conceivable to utilize a different design, not shown in the figures, wherein the output element 7 with the protrusion 15 is blocked after the blocking element 9 has reached its blocking position, a blockade being effected via a self-locking of the electromotor 5 or via a separate blocking device. In this design, the reset of the blocking element 9 is effected via a release of the blocking device or via a reverse movement of the electromotor 5.

The invention claimed is:
1. A drive unit for a motor vehicle component, comprising:
an output element having a protrusion, an electromotor provided for rotating the output element,
an actuator,
a blocking element which is acted on by the actuator and engageable with the protrusion, and
a stop that is fixed to a housing of the drive unit, wherein the blocking element is engageable against the stop when in a resting position in which the stop prevents movement of the blocking element,
wherein the protrusion engages the blocking element to disengage the blocking element from the stop and move the blocking element out of the resting position during a rotational movement of the output element, and
wherein after the blocking element is disengaged from the stop, the blocking element is moved by the actuator into a blocking position in which the blocking element blocks the protrusion and rotation of the output element beyond a specified point.

2. The drive unit of claim 1, wherein the blocking element situated in the blocking position is transferred by a cessation of force of the output element into a resting position adjacent on the stop.

3. The drive unit of claim 1, wherein the blocking element is pivotably accommodated in a guide.

4. The drive unit of claim 3, wherein the guide is integrally formed with the stop.

5. The drive unit of claim 1, wherein the blocking element has two legs that each have a longitudinal axis that is 90 degree relative to the longitudinal axis of another one of the two legs.

6. The drive unit of claim 5, wherein one leg of the blocking element is formed at one end as a blocking nose interacting with the stop and at another end as a curved contour interacting with the protrusion.

7. The drive unit of claim 6, wherein the stop and the blocking nose have forms fitting into one another in a tongue-and-groove connection.

8. The drive unit of claim 7, wherein another leg of the blocking element is configured as a bearing eye pivotably accommodated in a guide.

9. The drive unit of claim 5, wherein one of the two legs of the blocking element is configured as a bearing eye pivotably accommodated in a guide.

10. The drive unit of claim 9, wherein the blocking element is equipped with a pin on which the actuator engages.

11. The drive unit of claim 6, wherein another leg of the blocking element is configured as a bearing eye pivotably accommodated in a guide.

12. The drive unit of claim 5, wherein the blocking element is equipped with a pin on which the actuator engages.

13. The drive unit of claim 1, wherein the blocking element is equipped with a pin on which the actuator engages.

14. The drive unit of claim 13, wherein the actuator element is formed as a spring.

15. The drive unit of claim 13, wherein the actuator element is formed as a storage lever sensing a position of a locking mechanism.

16. The drive unit of claim 1, wherein the actuator element is formed as a spring.

17. The drive unit of claim 1, wherein the actuator element is formed as a storage lever sensing a position of a locking mechanism.

18. The drive unit of claim 1, wherein the blocking element and the stop have a tongue-and groove connection therebetween whereby the blocking element is fittingly received within the stop.

* * * * *